UNITED STATES PATENT OFFICE.

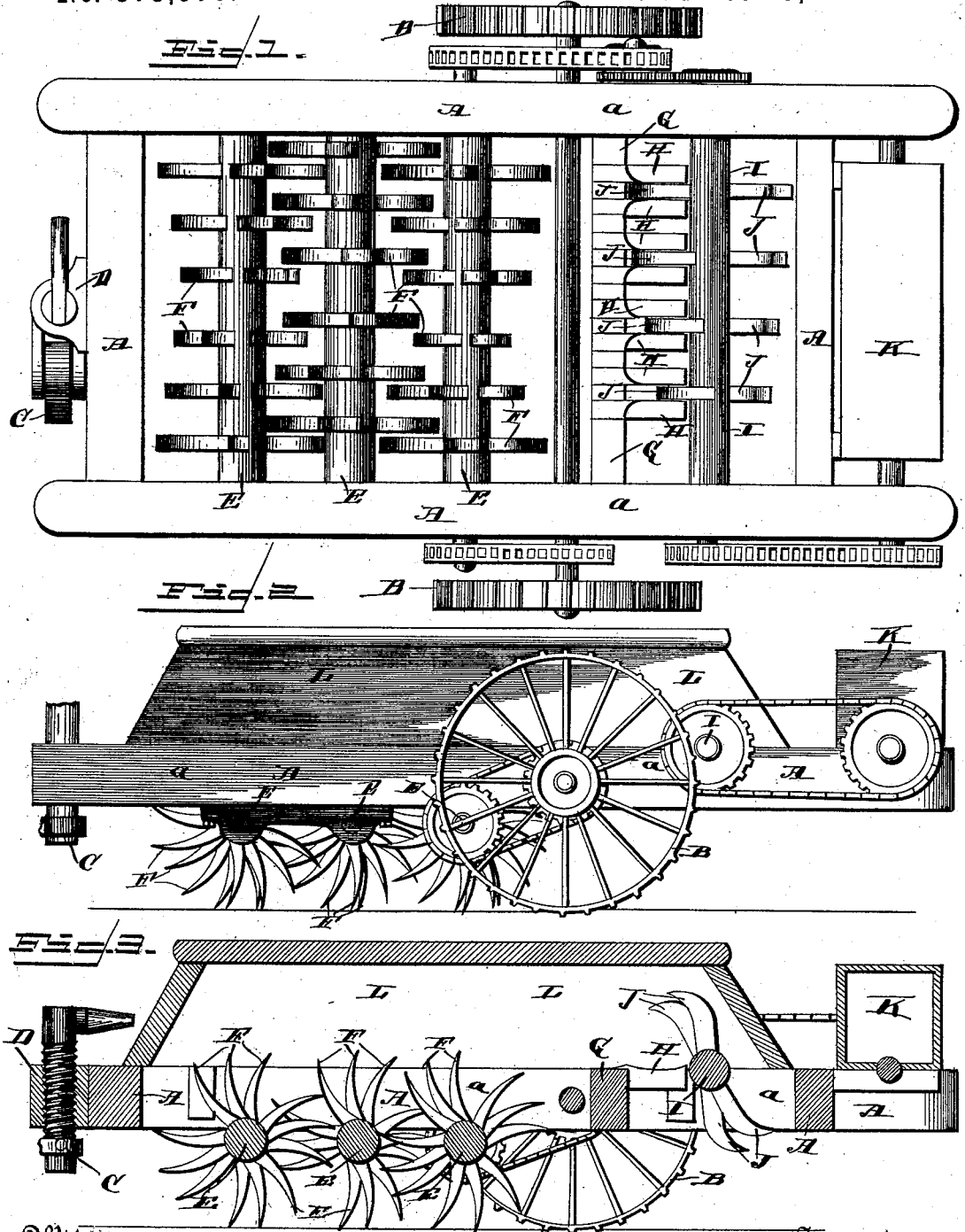

DAVID JOHNSON, OF WEST POINT, NEBRASKA, ASSIGNOR OF ONE-HALF TO JOSEPH RUESING AND CHARLES SCHUETH, SR., BOTH OF SAME PLACE.

COMBINED PULVERIZER AND CORNSTALK-CUTTER.

SPECIFICATION forming part of Letters Patent No. 373,370, dated November 15, 1887.

Application filed August 31, 1887. Serial No. 248,398. (No model.)

*To all whom it may concern:*

Be it known that I, DAVID JOHNSON, a citizen of the United States, residing at West Point, in the county of Cumming and State of Nebraska, have invented a new and useful Improvement in Pulverizer and Cornstalk-Cutter Combinations, of which the following is a specification.

My invention relates to improvements in combined pulverizers, cornstalk-cutters, and seeding-machines; and it consists in certain novel features, hereinafter described and claimed.

In the accompanying drawings, Figure 1 is a plan view of my improved machine with the top or cover removed. Fig. 2 is a side elevation of my machine, and Fig. 3 is a central longitudinal section of the same.

Referring to the drawings by letter, A designates a rectangular frame supported on traction-wheels B, as shown. At the rear end of the frame I provide a caster, C, which is adjustably secured in a bracket, D, on the rear cross-bar of the frame.

E E E designate a series of transverse shafts arranged in rear of the traction-wheels B, the ends of the shafts being journaled in suitable bearing-boxes secured to the under sides of the side bars, a a, of the supporting-frame. In the drawings I have shown the front one of these shafts as extended past the side bars of the frame and provided with sprocket-wheels, which are geared to the shaft of the traction-wheels by a sprocket-chain; but it will be understood that all of the shafts could be so geared, and also that it is not necessary to so gear any of them. All of said shafts are provided with the pulverizing-teeth F, which are arranged spirally around the shafts, and are so shaped as to turn up the earth as the machine is drawn forward. The teeth are of such length and are so arranged on the several shafts that they intermesh as they are rotated, as will be understood on reference to Fig. 1. The spiral arrangement of the teeth brings some of them into engagement with the earth at all times, and the intermeshing of the teeth causes a thorough crushing and pulverizing of all clods which may be lifted by any of the teeth.

Just in front of the shaft of the traction-wheels I secure a cross bar or beam, G, to the front side of which I attach a series of forwardly-projecting knives, H, and in front of these knives I journal in the side bars of the frame a transverse shaft, I, to which I secure a spirally-arranged series of lifting-fingers, J. These fingers are so arranged that each finger will pass between two of the knives H as the shaft I is revolved, and the said shaft is geared to the shaft of the traction-wheels, so as to be driven thereby, but in a direction contrary thereto.

At the front end of the machine I provide the seed-planter K, which is driven by the transverse shaft I through a sprocket-gearing, as shown. The seed-planter is also provided with the tongue or shafts for the attachment of the draft-animals, as will be understood.

L indicates a top or cover, which is supported by the rectangular frame A and covers the pulverizing-teeth, the lifting-fingers, and the stalk-cutting knives.

The construction and arrangement of the several parts of my machine being thus described, its operation will be readily understood. As the machine is drawn over the ground the traction-wheels will, through the sprocket chains and wheels, drive the lifting-fingers J and the pulverizers, as before stated. The lifting-fingers will lift the stalks and other trash left on the ground and carry them around against the knives H, by which they will be cut into small pieces. The pulverizers at the rear of the machine break up and pulverize the earth, so that the ground is thoroughly cultivated. The machine is normally supported by the traction-wheels and the pulverizers, and when it is desired to raise the pulverizers from the ground the caster at the rear end of the machine is lowered, so as to rest upon the ground and raise the machine. This is very easily accomplished, as the shank or standard of the caster is screw-threaded and is provided at its upper end with a short lever or crank handle, and the supporting-bracket is internally screw-threaded, so that by rotating the caster-shank the caster will be raised or lowered, as may be desired.

It will be observed that my device is very simple in construction, and it is thought its advantages will be readily appreciated.

Having thus described my invention, what I claim, and desire to secure by Letters Patent, is—

An improved pulverizer and stalk-cutter comprising a rectangular supporting-frame mounted on traction-wheels, a series of pulverizers mounted in the rear portion of the supporting-frame, the forwardly-projecting knives rigidly secured in the supporting-frame in advance of the traction-wheels, the lifting-fingers working in front of said knives, gearing whereby the lifting-fingers are driven by the traction-wheels, and a lid or cover, L, resting on the supporting-frame and covering the pulverizers, the lifting-fingers, and the stalk-cutting knives, substantially as specified.

In testimony that I claim the foregoing as my own I have hereto affixed my signature in presence of two witnesses.

DAVID JOHNSON.

Witnesses:
CHAS. OXFORD,
URIAH BRUNER.